(12) United States Patent
Collins et al.

(10) Patent No.: US 7,332,459 B2
(45) Date of Patent: Feb. 19, 2008

(54) METHOD FOR SCALE INHIBITION IN OIL WELLS

(75) Inventors: Ian Ralph Collins, Sunbury-on-Thames (GB); Simon Neil Duncum, Bracknell (GB)

(73) Assignee: BP Exploration Operating Company Limited, Middlesex (GB)

( * ) Notice: Subject to any disclaimer, the term of this patent is extended or adjusted under 35 U.S.C. 154(b) by 91 days.

(21) Appl. No.: 10/511,747

(22) PCT Filed: May 15, 2003

(86) PCT No.: PCT/GB03/02100

§ 371 (c)(1),
(2), (4) Date: Mar. 10, 2005

(87) PCT Pub. No.: WO03/106810

PCT Pub. Date: Dec. 24, 2003

(65) Prior Publication Data

US 2005/0159559 A1    Jul. 21, 2005

(30) Foreign Application Priority Data

Jun. 13, 2002  (GB)  ................... 0213600.0

(51) Int. Cl.
*C08F 20/62* (2006.01)
*C09K 8/52* (2006.01)

(52) U.S. Cl. .............. 507/224; 507/225; 507/226; 507/227; 507/230; 507/231; 507/260; 507/266; 507/267; 525/329.5; 525/329.7; 525/329.8; 525/330.1; 525/330.3; 525/330.4; 525/330.6

(58) Field of Classification Search ............. 507/224, 507/266; 525/329.7
See application file for complete search history.

(56) References Cited

U.S. PATENT DOCUMENTS

| | | | | |
|---|---|---|---|---|
| 3,487,018 A | * | 12/1969 | Troscinski | ............ 210/699 |
| 3,580,855 A | * | 5/1971 | Mickus | .............. 252/181 |
| 3,728,420 A | * | 4/1973 | Stanford et al. | ........... 558/186 |
| 3,931,038 A | * | 1/1976 | Mochi-Bartolani et al. | . 252/181 |
| 3,959,177 A | * | 5/1976 | Martin | ............ 252/389.2 |
| 4,042,323 A | * | 8/1977 | Redmore et al. | ............ 422/12 |
| 4,061,695 A | * | 12/1977 | Tai et al. | .............. 558/164 |
| 5,023,001 A | * | 6/1991 | Amjad et al. | ............. 210/699 |
| 5,060,728 A | * | 10/1991 | Yan | .................... 166/279 |
| 5,089,150 A | | 2/1992 | Hen | .................... 507/221 |
| 5,254,634 A | * | 10/1993 | Ito et al. | ............. 525/330.3 |
| 5,856,409 A | * | 1/1999 | Ziemelis et al. | ........ 525/330.2 |
| 6,300,423 B1 | * | 10/2001 | Engelhardt et al. | ........ 525/381 |
| 6,380,136 B1 | | 4/2002 | Bates et al. | ................ 507/90 |

FOREIGN PATENT DOCUMENTS

WO    WO 02/40828 A1    5/2002

* cited by examiner

*Primary Examiner*—Randy Gulakowski
*Assistant Examiner*—John J. Figueroa
(74) *Attorney, Agent, or Firm*—Nixon & Vanderhye

(57) ABSTRACT

A method of inhibiting scale formation in a subterranean formation comprising: (a) injecting a suspension comprising particles of a controlled release scale inhibitor suspended in an aqueous medium into a formation through an injection well wherein the particles have a mean diameter of less than 10 microns, preferably less than 5 microns, more preferably less than 1 micron; (b) allowing the suspension to percolate through the subterranean formation towards a production well; and (c) controllably releasing the scale inhibitor from the particles in the near well bore region of the production well. Suitably, the particles of the controlled release scale inhibitor comprise an esterifiable scale inhibitor cross-linked with a polyol via ester cross-links.

16 Claims, No Drawings

METHOD FOR SCALE INHIBITION IN OIL WELLS

This application is the U.S. National Phase of International Application PCT/GB03/02100, filed May 15, 2003, which designated the U.S. PCT/GB03/02100 claims priority to British Application No. 0213600.0 filed 13 Jun. 2002. The entire content of these applications are incorporated herein by reference.

This present invention relates to scale inhibitors and their use. Scale inhibitors are used in production wells to stop scaling in the formation and/or in the production lines down hole and at the surface.

Scale is a slightly soluble inorganic salt, such as barium or strontium sulphate, calcium carbonate, calcium sulphate or calcium fluoride. In the production of hydrocarbons from these subterranean formations the deposition of scale on surfaces and production equipment is a major production problem. Scale build-up decreases permeability of the formation, reduces well productivity and shortens the lifetime of production equipment. In order to clean scaled-up wells and equipment it is necessary to stop the production i.e. by killing the well which is time-consuming and costly.

Scale formation can be reduced by the introduction of inhibitors into the formation. U.S. Pat. No. 5,089,150 relates to a method of extending the life of a scale inhibitor by cross-linking an inhibitor with a polyalcohol. The scale inhibitor includes carboxylated polymers, phosphorus-containing materials such as organophosphates, organophosphonates and polyphosphonates. Said carboxylated polymer contains either wholly or partially, an alpha, beta olefinically unsaturated carboxylic acid with a molecular weight of 200 to 20,000. The organophosphorus-containing inhibitors include alkyl ethoxylated phosphates; ethylenediaminetetramethylene phosphonic acid; aminotrimethylene phosphonic acid; hexamethylenediaminetetramethylene phosphonic acid; diethylenetriaminepentamethylene phosphonic acid; hydroxyethylidene diphosphonic acid and polyvinyl phosphonic acids. Polyacrylic acid and phosphino polyacrylic acid having a molecular weight of about 1,000 to about 5,000 are preferred scale inhibitors. Polyalcohols which can be utilized are those having two or more hydroxyl functions. Exemplary polyalcohols include ethylene glycol, glycerol, and polyvinyl alcohols. Cross-linking occurs by esterification of the carboxylic acid in the inhibitor with the hydroxyl groups in the polyalcohol which results in a large molecular weight increase. In the case of an organophosphorus-containing inhibitor, cross-linking occurs by esterification of the phosphoric or phosphonic acid in the inhibitor with the hydroxyl group in the polyalcohol. The increased molecular weight of the cross-linked inhibitor enhances its retention in subterranean formations. When the desired molecular weight or viscosity has been obtained, the cross-linked polymer is partially neutralized with a base and directed into a formation by a well. The esterified cross-linked inhibitor releases the inhibitor through hydrolysis of an ester which release is dictated by the extent of cross-linking, steric hindrance and temperature. The cross-linked inhibitor is said to be viscous but non-gelled.

SPE 64988 (prepared for the 2001 SPE International Symposium on Oilfield chemistry held in Houston, Tex., Feb. 13-16, 2001) describes stable size-controlled microgels formed by crosslinking polymers under shear flow. It is said that these microgels are expected to control water mobility at long distances from wells to improve sweep efficiency and reduce selectively permeability to water for water production control. However, there is no suggestion that size-controlled microgels of cross-linked scale inhibitors can be formed under shear flow.

It has now been found that size-controlled microparticles of cross-linked scale inhibitor having a mean particle diameter of less than 10 microns, preferably less than 5 microns, more preferably less than 1 micron may be formed under conditions of high shear or by comminution of a dried macrogel comprising cross-linked scale inhibitor. It has also been found that such size-controlled particles may be injected into a formation through an injection well and may propagate through the formation to the near-well region of a production well where the scale inhibitor is released through hydrolysis of the ester cross-links thereby inhibiting deposition of scale in the formation and/or in production lines downhole and at the surface.

Thus, in a first embodiment of the present invention there is provided particles of an esterifiable scale inhibitor cross-linked with a polyol via ester cross-links wherein the particles have a mean diameter of less than 10 microns.

Preferably, the mean diameter of the particles is less than 5 microns, more preferably less than 1 micron.

The scale inhibitor is carboxylic acid-containing, organophosphorus-containing or organosulfur-containing.

Carboxylic acid-containing scale inhibitors are polymers based wholly or in part on an alpha,beta-ethylenically unsaturated carboxylic acid. Thus, suitable carboxylic acid-containing scale inhibitors include all homopolymers or copolymers (composed of two or more co-monomers) containing as one of its components, an alpha,beta-ethylenically unsaturated carboxylic acid such as acrylic acid, methacrylic acid, maleic acid, maleic anhydride, itaconic acid, fumaric acid, mesoconic acid and citraconic acid, and monoesters of dicarboxylic acids with alkanols having 1-8 carbon atoms. When the scale inhibitor is a copolymer, the other component monomer can be an alpha,beta-ethylenically unsaturated monomer containing a non-polar group such as styrene or olefinic monomers; an alpha,beta-ethylenically unsaturated monomer containing a polar functional group such as vinylacetate, vinyl chloride, vinyl alcohol, acrylate ester, acrylamide or acrylamide derivatives; and an alpha,beta-ethylenically unsaturated monomer containing an ionic functional group comprising methacrylic acid, maleic acid, styrenesulfonic acid, 2-acrylamido-2-methylpropane-sulfonic acid (AMPS), vinylsulfonic acid, and vinylphosphonic acid. Suitable carboxylic acid-containing scale inhibitors include phosphino-polyacrylic acid polymers sold as Belsperse 161 ™ or Bellasol S-29™ or a phosphino-copolymer of acrylic acid and AMPS sold as Bellasol S-50™.

Suitable organophosphorus-containing inhibitors include organophosphates, organophosphonates and polyphosphonates. Preferred organophosphorus containing inhibitors include alkyl ethoxylated phosphates; ethylenediamenetetramethylene phosphonic acid; aminotrimethylene phosphonic acid; hexamethylenediaminetetramethylene phosphonic acid; diethylenetriaminepentamethylene phosphonic acid; hydroxyethylidene diphosphonic acid and polyvinylphosphonic acid. Preferred organophosphorus compounds are described in U.S. Pat. Nos. 3,336,221 and 3,467,192. These patents are incorporated by reference herein.

Suitable organosulfur-containing inhibitors include homopolymers of vinylsulfonic acid, homopolymers of styrene sulfonic acid, copolymers of vinylsulfonic acid and styrene sulfonic acid, copolymers of vinylsulfonic acid and AMPS, copolymers of styrene sulfonic acid and AMPS and copolymers of vinylsulfonic acid, styrene sulfonic acid and AMPS. Optionally, the organosulfur-containing copolymers may comprise an alpha-beta-ethylenically unsaturated comonomer containing a non-polar group, as described above for the carboxylic acid-containing polymeric scale inhibitors.

Preferably, the molecular weight range of the polymeric scale inhibitors utilized in this invention is from about 200 to about 20,000, more preferably about 800 to about 10,000, most preferably about 1,000 to about 5,000.

Where the scale inhibitor is a copolymer comprising units derived from an alpha,beta-ethylenically unsaturated carboxylic acid and/or an alpha,beta-ethylenically unsaturated phosphonic acid, and/or an alpha, beta-ethylenically unsaturated sulphonic acid, the mole % of such units in the copolymer is preferably in the range 1 to 99 mole %, most preferably in the range 10 to 90%.

Suitable polyols include all compounds containing two or more hydroxyl groups. These include ethylene glycol, glycerol and their higher homologs; dihydroxy-terminated polyethylene oxides or polypropylene oxides; polyvinyl alcohols of varying degrees of hydrolysis and molecular weight; modified polyvinyl alcohols or co-polymers of vinyl alcohol. The molecular weight range of the polyol is from about 62 to several millions; preferably in the range 500 to 130,000, more preferably in the range 5,000 to 50,000, most preferably in the range 10,000 to 20,000.

The scale inhibitor is cross-linked with the polyol via esterification of the carboxylic acid and/or phosphonic acid and/or sulfonic acid in the scale inhibitor with the hydroxyl groups in the polyol by heating a concentrate of the reactants in water in the presence of a strong acid catalyst. Preferably, the strong acid catalyst is selected from the group consisting of hydrochloric acid, sulfuric acid and trifluoromethanesulfonic acid.

Suitably, the concentrate may be generated by introducing an aqueous solution of the esterifiable scale inhibitor and an aqueous solution of the polyol into a reaction vessel. The reaction vessel may contain an aqueous solution of the strong acid catalyst. Alternatively, at least one of the aqueous solutions introduced into the reaction vessel may contain the strong acid catalyst. Suitably, the aqueous solution of esterifiable scale inhibitor and aqueous solution of polyol are introduced into the reaction vessel in a ratio of from 10:90 to 90:10 by volume, preferably 30:70 to 70:30 by volume, most preferably 45:55 to 55:45 by volume, for example 50:50 by volume.

Suitably, the concentration of esterifiable scale inhibitor in the concentrate is in the range 10 to 75% by weight, preferably, 20 to 60% by weight.

Suitably, the concentration of polyol in the concentrate is in the range 1 to 50% by weight, preferably, 2.5 to 35% by weight, more preferably 10 to 25% by weight.

Suitably, the concentrate is heated to a temperature of 50° to 150° C. The person skilled in the art would understand that the duration of the esterification reaction will be dependent upon the nature of the esterifiable scale inhibitor. Typically, the esterification reaction is continued for about 6 to 60 hours, for example, 12 to 48 hours or 12 to 24 hours.

Typically, the concentration of acid in the concentrate is at least 0.5 M, preferably at least 1 M, more preferably at least 2 M, for example, at least 2.25 M. Preferably, when the desired degree of esterification has been achieved, the product is partially neutralized with base to quench the esterification reaction.

Suitably, the reactor vessel may be operated under conditions of high shear in which case the product of the esterification reaction is a microgel of the esterifiable scale inhibitor cross-linked with the polyol via ester cross-links wherein the microgel particles have a mean particle diameter of less than 10 microns, preferably less than 5 microns, more preferably less than 1 micron.

Thus, according to a second embodiment of the present invention there is a provided a process for preparing a microgel of an esterifiable scale inhibitor cross-linked with a polyol via ester cross-links comprising:
heating, in a reactor vessel, a concentrate comprising water, an esterifiable scale inhibitor, a polyol and a strong acid catalyst under conditions of high shear thereby cross-linking said scale inhibitor and forming a microgel having a mean particle diameter of less than 10 microns, preferably less than 5 microns, more preferably less than 1 micron.

The reactor vessel may comprise any device suitable for mixing the concentrate under high shear so as to obtain a homogenous and reproducible microgel. Suitably, the high shear mixing device may be an Ultraturrax™, Silverson™ or Couette™ mixer. Suitably, the shear rate in the reactor vessel is at least 0.5 ms$^{-1}$, preferably, at least 1 ms$^{-1}$, more preferably, at least 5 ms$^{-1}$, for example, at least 10 ms$^{-1}$.

Preferably, the particles of the microgel have a mean diameter of less than 1 μm, more preferably 100-750 nm, most preferably 200-500 nm, for example, 200-300 nm.

Preferably, the particles are present in the microgel in an amount of from 20 to 40 weight percent.

Preferably, the esterification reaction takes place in the presence of a surfactant in order to assist in dispersing the particles of the microgel. Suitable surfactants include water-soluble surfactants such as sodium dioctylsulfosuccinate, sodium N-oleyl-N-methyltaurate, sodium olefin($C_{14}$-$C_{16}$) sulfonate, sodium polyoxyethylene lauryl sulfate, ethylenediamine alkoxlate block copolymer, 2,4,7,9-tetramethyl-5-decyne-4,7-diol ethoxylate, octylphenoxypolyethoxy ethanol, polydimethylsiloxane methylethoxylate, polyethoxylated oleyl alcohol, polyethoxylated castor oil, polyoxyethylene sorbitan monolaurate, polyoxyethylene sorbitan monooleate, polyoxyethylene dodecyl ether, polyoxyethylene lauryl alcohol, poly(oxyethylene-co-oxypropylene) block copolymer, poly(oxyethylene-co-oxypropylene) block polymer, p-[sonomylphenoxypoly(glycidol)], and cetyl trimethyl ammonium bromide and oil-soluble surfactants such as sorbitan monostearate, sorbitan monooleate, and octylphenol ethoxylate. Preferably, the concentration of surfactant in the concentrate is 0.01% to 1%, most preferably 0.05 to 1% by weight.

Preferably, the particles of the microgel may be coated, for example, with a polymer or wax which dissipates in water or oil above a threshold temperature, for example, above a temperature of 75° C., 100° C. or 125° C. Suitably, prior to its dissipation, the coating of polymer or wax reduces the rate of diffusion of water into the particles and also the rate of diffusion of an aqueous solution of the scale inhibitor out of the particles.

Suitably, the polymers used for coating the particles of the microgel may be water-soluble polymers or oil-soluble polymers. Preferred water-soluble polymers for coating the particles of the microgel include polyacrylic acids; polymaleic acids; polyacrylamide; polymethacrylate; polyvinylsulphonates; copolymers of monomers selected from the group consisting of acrylic acid, maleic acid, acrylamide, methacrylate, 2-acrylamido-2-methylpropane-sulfonic acid, and vinylsulphonate; lignosulphonates; hydroxy methyl cellulose; carboxy methyl cellulose; carboxy methyl ethyl cellulose; hydroxy methyl ethyl cellulose; hydroxyl propyl methyl cellulose; methyl hydroxy propyl cellulose; sodium alginates; polyvinyl pyrolidone; polyvinyl pyrolidone acrylic acid co-polymers; polyvinyl pyrolidone carolactam co-polymers; polyvinyl alcohol; polyphosphates, polystyrene-maleinates, poloxamers, poloxamines, and starch. Suitably, the poloxamers are linear ABA block co-polymers having the general structure $(EO)_n$-$(PO)_m$-$(EO)_n$ where n and m are integers and EO and PO represents structural units derived from ethylene oxide and propylene oxide respectively. Suitably, the polaxamines are ABA block co-polymers having a branched structure with a central ethylene diamine bridge i.e. $([(EO)_n$-$(PO)_m]_2$—N—$CH_2$—$CH_2$—N-$[(EO)_n$-$(PO)_m]_2)$ where n, m, EO and PO have the same meaning as for the poloxamers. Suitable starches include those described in WO 02/12674 which is herein incorporated by reference. Preferably, the water-soluble polymer has a molecular weight in the range 1,000-100,000, preferably 5,000 to 30,000, for example, 15,000 to 25,000. Preferred oil-soluble polymers for coating the particles of the microgel include polyethers, polyamine derivatives or carbon backbone polymers having pendant nitrogen and/or oxygen atoms as described in EP 0902859 which is herein incorporated by reference. Preferred waxes for coating the particles of the microgel include paraffin waxes.

The polymer or wax may be added to the concentrate in the reactor vessel during the later stages of the esterification reaction. However, it is preferred to quench the esterification reaction, for example, with a base, before adding the polymer to the concentrate. Without wishing to be bound by any theory, the polymer will precipitate onto the gelled particles and will at least partially coat the particles. Suitably, at least 75%, preferably, at least 90%, more preferably, at least 95% of the surface of the particles is coated with the polymer. Preferably, the coating is continuous (100% surface coverage). Preferably, the coating has a thickness of less than 30 nm, preferably, less than 20 nm.

Suitably, the microgel can be concentrated by evaporation of the water phase to form a concentrated microgel. Preferably, the microgel particles are present in the concentrated microgel in an amount of from 30 to 50 weight %.

The microgel can also be dried, for example, by freeze drying or spray drying, to form a dispersible powder comprising microparticles of the esterifiable scale inhibitor crosslinked with the polyol. Preferably, the microgel is dried by spraying the microgel onto a spinning heated disc. Without wishing to be bound by any theory, it is believed that, at least in the case of uncoated particles, the resulting dried particles may no longer be gelled i.e. any water incorporated into the particles may be removed during the drying step thereby generating substantially anhydrous particles. In the absence of a coating, such substantially anhydrous particles will swell when redispersed in water. However, it is envisaged that such substantially anhydrous uncoated particles may be provided with an oil-soluble polymeric or wax coating by adsorption of the oil soluble polymer or wax, from solution in an organic solvent, onto the surface of the substantially anhydrous particles. Suitable oil-soluble polymers or waxes for coating the substantially anhydrous particles include those described above. It is also envisaged that the uncoated particles may be coated with a water-soluble polymer by absorption of the water-soluble polymer from an aqueous solution thereof to form coated gelled particles. Suitable water-soluble polymers include those described above.

It is also envisaged that the esterification reaction may take place in a conventional stirred vessel operated under low shear conditions so as to form a macrogel of the esterifiable scale inhibitor cross-linked with a polyol. The resulting macrogel is then dried and the resulting solid is subsequently comminuted to give particles of cross-linked scale inhibitor having a mean particle diameter of less than 10 microns, preferably less than 5 microns, more preferably less than 1 micron.

Thus, according to a third embodiment of the present invention, there is provided a process for preparing particles of an esterifiable scale inhibitor cross-linked with a polyol via ester cross-links comprising the steps of:

a) heating, in a reactor vessel, a concentrate comprising water, an esterifiable scale inhibitor, a polyol and a strong acid catalyst under low shear conditions thereby forming a macrogel of the esterifiable scale inhibitor cross-linked with the polyol;

b) drying the macrogel to form a solid; and c) comminuting the solid to give particles of esterifiable scale inhibitor cross-linked with polyol having a mean particle diameter of less than 10 microns, preferably less than 5 microns, more preferably less than 1 micron.

Suitably, in this embodiment of the present invention, the concentrate is stirred using, for example, a mechanical stirrer such as a paddle, an ultrasonic stirrer or by bubbling an inert gas through the concentrate.

By macrogel is meant that the gel either does not comprise individual gelled particles or any individual gelled particles have a mean particle diameter which is substantially higher than 10 microns, in particular, substantially higher than 1 micron, for example, where the individual gelled particles have a mean particle diameter of above 100 microns.

By low shear conditions is meant the shear rate in the reactor vessel is less than 0.25 $ms^{-1}$, preferably, less than 0.1 $ms^{-1}$, more preferably less than 0.005 $ms^{-1}$, for example, less than 0.001 $ms^{-1}$.

Suitably, the reaction product of step (a) is allowed to settle such that the product separates into an upper water phase and a lower gel phase. The upper water phase is then removed from the lower gel phase, for example, by decantation.

Suitably, the gel phase may be dried using any suitable drying technique for example, in an oven or by freeze drying or by spray drying. Suitably, the resulting solid is substantially anhydrous by which is meant that the solid preferably contains less than 0.1% by weight of water, more preferably less than 0.05% by weight of water.

Suitably, the comminuted particles have a mean diameter of less than 10 microns, preferably less than 5 microns, more preferably less than 1 micron. Preferably, the comminuted particles have particle diameters in the range 100-750 nm, more preferably 200-500 nm, most preferably 200-300 nm.

The solid formed in step (b) may be comminuted using any suitable technique to obtain particles of the required size. Thus, the solid may be comminuted by jet-milling, ball-milling or blade milling or may be comminuted in a pulveriser, for example, a Fritsch pulveriser. Other suitable comminution techniques are described in Section 8 Perry's Chemical Engineers Handbook, 4th Edition, 1963, which is herein incorporated by reference. Preferably, the solid may be comminuted by wet-milling, for example, in the presence of water or an oil, for example, diesel oil or kerosene, or an organic solvent, for example, a glycol ether, so as to mitigate the risk of agglomeration of the comminuted particles. Where the solid is comminuted by dry-milling or by wet-milling in the presence of an oil or an organic solvent, the resulting particles are substantially anhydrous. Where the solid is comminuted by wet-milling in the presence of water, the comminuted particles will swell in the water to form gelled particles. Preferably, the solid is wet-milled in the presence of a surfactant so as to further mitigate the risk of agglomeration of the comminuted particles. Examples of suitable surfactants include those described above. The solid may also be comminuted in the presence of a polymer which coats the exposed surfaces of the comminuted particles. Without wishing to be bound by any theory, the polymeric coating reduces the rate at which water diffuses into and a solution of the scale inhibitor in water diffuses out of the comminuted particles. Preferably, the polymer has surface active properties and therefore also acts to mitigate the risk of agglomeration of the comminuted particles. Suitable coating polymers include those described above.

In yet a further embodiment of the present invention there is provided a suspension comprising particles of an esterifiable scale inhibitor cross-linked with a polyol via ester cross-links dispersed in a liquid medium wherein the mean diameter of the particles is less than 10 microns, preferably less than 5 microns, more preferably less than 1 micron.

The suspension may comprise particles prepared as described above.

The liquid medium may be an oil, an organic solvent or water, preferably water. Where the liquid medium is an oil, the oil may be kerosene, diesel, biodiesel, base oil or crude oil. Where the liquid medium is an organic solvent, it is preferred that the organic medium is a water dispersible solvent, for example, a mutual solvent such as methyl butyl ether (MBE), ethylene glycol monobutyl ether (EGMBE), butyl glycol ether (BGE) or a biodegradable ester solvent such as Arrivasol™. Where the liquid medium is water, the water may be fresh water, river water, aquifer water or sea water.

Suitably, the particles are dispersed in the liquid medium in an amount of from 20 to 50, preferably 30 to 50% by weight.

In yet a further embodiment of the process of the present invention there is provided a method of inhibiting scale formation in a subterranean formation comprising:
(a) injecting a suspension comprising particles of a controlled release scale inhibitor suspended in an aqueous medium into a formation through an injection well wherein the particles have a mean diameter of less than 10 microns, preferably less than 5 microns, more preferably less than 1 micron;
(b) allowing the suspension to percolate through the subterranean formation towards a production well; and
(c) controllably releasing the scale inhibitor from the particles in the near well bore region of the production well.

By "near well bore region of the production well" is meant a radial distance of less than 100 feet, preferably less than 50 feet, more preferably, less than 30 feet from the well bore of the production well.

Preferably, the particles comprise an esterifiable scale inhibitor crosslinked with a polyol through ester cross-links with the scale inhibitor being controllably released in the near well bore region of the production well through hydrolysis of the ester cross-links Suitably, the particles may be gelled particles which may be coated or uncoated (as described above) or coated anhydrous particles (as described above).

The rate of ester hydrolysis will be dependent upon both the temperature and the pH which the particles encounter in the formation. Typically, the suspension is injected down the injection well at a temperature of less than 10° C., for example 3 to 5° C. Typically, the temperature of the subterranean formation in the near well bore region of the producing well is in the range 75-150° C. The temperature of the injected suspension will therefore increase as it percolates through the formation. The increase in temperature of the injected suspension with increasing radial distance from the injection well can be accurately determined (as would be well known to the man skilled in the art). The pH within the formation can also be readily determined. The molecular weights of the esterifiable scale inhibitor and/or of the polyol can be controlled. Also, the extent of crosslinking of the scale inhibitor may be controlled (for example, by controlling the concentration of the acid catalyst, the duration of the esterification reaction and the ratio of esterifiable scale inhibitor to polyol) so that the particles release substantially all of the scale inhibitor (through hydrolysis of the ester linkages) in the near well bore region of the production well. Suitably, the particles start to release the scale inhibitor through hydrolysis of the ester cross-links at a temperature of 50 to 150° C. Where necessary, the particles may be coated with a coating which dissipates above a threshold temperature. Typically, the threshold temperature is less than the temperature of the near well bore region of the production well and is substantially above the temperature of the injected suspension. Suitably, the threshold temperature is at least 2.5° C. below, preferably at least 5° C. below, more preferably at least 10° C. below the temperature of the near well bore region of the production well. Suitably, the particles may be coated with a coating comprising an oil or water dispersible polymer as described above.

Suitably, the suspension comprises particles of esterifiable scale inhibitor cross-linked with a polyol suspended in injection water (e.g. river water, aquifer water or seawater). The particles readily enter the porous formation and will travel through the formation together with the injection water.

Suitably, the suspension propagates through the formation at a rate of 15 to 100 feet per day. Typically, the temperature of the injected suspension increases at a rate of 1 to 10° C. per 100 feet in the radial direction from the injection well towards the production well. Suitably, the injection well is 0.25 to 1 mile from the production well.

Suitably, the particles start to release the scale inhibitor through hydrolysis of the ester cross-links at a temperature of 50 to 75° C.

Typically, a dispersible powder comprising cross-linked scale inhibitor particles having a mean particle diameter of less than 10 microns, preferably less than 5 microns, more preferably less than 1 micron or a suspension comprising such particles suspended in a liquid medium is dosed into the injection water.

The dispersible powder or suspension may be continuously dosed into the injection water in which case the amount of cross-linked scale inhibitor particles in the injection water is selected so that substantially all of the scale inhibitor is released in the near well bore region to give an effective concentration of scale inhibitor. The cross-linked scale inhibitor is preferably continuously dosed into the injection water in an amount in the range 0.01 to 2 weight percent, preferably 0.01 to 1 weight percent, more preferably 0.01 to 0.1 weight percent.

The dispersible powder or suspension may be intermittently dosed into the injection water in which case the dosage may be higher, preferably, 1 to 5 weight percent, more preferably 2 to 5 weight percent. Here the scale inhibitor is released from the particles in the near well bore region and at least, in part, adsorbs onto the surfaces of the porous rock formation. During intervals when the dispersible powder or suspension is not being dosed into the injection water, the scale inhibitor leaches from the surfaces of the rock thereby maintaining an effective concentration of scale inhibitor for scale control. The amount of scale inhibitor released into the production water is preferably in the range 1 to 200 ppm.

It is also envisaged that a suspension comprising particles of esterifiable scale inhibitor cross-linked with a polyol via ester cross-links dispersed in a liquid medium (either an aqueous or organic liquid medium) and having a mean particle size of less than 10 microns, preferably less than 5 microns, more preferably less than 1 micron, may be injected into a formation under pressure via a production well. The production well is then preferably shut-in for 2-50 hours, for example, 5-15 hours during which time the suspension percolates into the formation and the particles are believed to become trapped in the formation matrix. The scale inhibitor is released from the particles through hydrolysis of the ester cross-links under the conditions encountered in the near well bore region of the production well. After shut-in, the well is returned to production. The produced fluids may be analyzed, for example, at the surface to monitor the concentration of scale inhibitor therein. Where the formation is oil-bearing, the shut-in process involving the introduction of the suspension may be optionally preceded by a pre-flush of the oil-bearing rock formation using an oil such as diesel, biodiesel, kerosene, base oil or crude oil. Introduction of the suspension may be followed by a subsequent separate step of over-flushing the production well with an oil. The oil used for the over-flush may be diesel, biodiesel, kerosene, base oil or oil produced by the well being treated. The amount of oil used for over-flushing the production well is suitably such that it reaches and flushes a target zone which is up to about 20 feet in a radial direction from the well bore. Suitably, the amount of oil used for the over-flush is in the range from 30 to 4000 bbls. Where the oil used for the over-flush is crude oil produced by the well being treated, the over-flush may be carried out in an inverse way e.g. as a back-sweep i.e. by making the crude oil as it emerges to the surface from the production well perform the function of the over-flush oil. After this period the crude oil production can be re-started. Where the suspension is squeezed into a hydrocarbon bearing zone of the formation it is preferred that the particles of esterifiable scale inhibitor are suspended in an organic liquid medium.

The invention will now be illustrated by means of the following examples.

EXAMPLE 1

Seawater (50 g) and polyacrylic acid having a molecular weight of about 2,100 (30 g) were introduced into a bottle and the resulting mixture was stirred using a magnetic stirrer until the polyacrylic acid was dissolved in the seawater. Polyvinyl alcohol having a molecular weight of about 16,000 (2.5 g; 98-98.8% hydrolysed) was ground into a fine powder and was then slowly added to the mixture in the bottle with rapid stirring. Stirring was continued until the polyvinylalcohol had dissolved.

The resulting concentrate was then heated to a temperature of between 85-90° C. with rapid stirring using a magnetic follower. The concentrate was then rapidly stirred at this temperature for 4 hours. Fuming hydrochloric acid was then added (15-15.5 g; 12.1 M) to the concentrate at a temperature of 85° C. to initiate the esterification reaction. A free flowing fluffy white gel was formed. The gel was left to stir for 24 hours during which time the viscosity of the gel appeared to increase. The pH of the gel at the end of the reaction was approximately 3. When cooled to room temperature the gel ceased 'flowing' and became notably more viscous.

EXAMPLES 2-4

Example 1 was repeated using 20 g (Example 2), 35 g (Example 3) and 40 g (Example 4) of polyacrylic acid. In each case, sufficient fuming hydrochloric acid was added to adjust the pH of the concentrate to approximately 3 at which point the concentrate turned cloudy. Between 18 g-19 g of fuming hydrochloric acid was added to the concentrate containing 20 g of polyacrylic acid, between 19 g-20 g of fuming hydrochloric acid was added to the concentrate containing 35 g of polyacrylic acid, and between 24 g-25 g of fuming hydrochloric acid was added to the concentrate containing 40 g of polyacrylic acid.

With 20 g of polyacrylic acid (Example 2), only a small amount of gel was formed. Using 30 g of polyacrylic acid (Example 1) produced a very light gel in terms of both colour and density, whereas using higher concentrations such as 35 g and 40 g (Examples 3 and 4 respectively) produced a significantly greater volume of gel that was darker in colour and higher in density than obtained with 20 g of polyacrylic acid, which settled rapidly out of solution. For all polyacrylic acid concentrations, the supernatant liquid above the gel was observed to be cloudy. The cloudiness of the supernatant liquid was attributed to unreacted polyacrylic acid and polyvinyl alcohol.

For each Example, the supernatant liquid was separated from the macroscopic gel by decantation. The wet solid was weighed and the dried in an extracted oven until the weight of the solid was constant. The solids were then reduced to powders using a variety of comminution methods: grinding in a mortar and pestle; pulverizing in a "Fritsch Pulverisette Type 14.702" pulveriser fitted with sieve ring sizes of 1.00 mm and 0.2 mm for between 20 minutes and 1 hour; and dry milling in a Retsch PM400 ball mill operated at 400 rpm for between 20 minutes and 1 hour. Following size reduction, the particles were then suspended in distilled water containing 0.02 g per ml of Tween 80 and then diluted into a larger volume of distilled water for particle sizing. The particle size of the suspension obtained in Example 4 was determined using a MicroTrac SRA 9200 laser particle sizer. The size distribution (volume weighted diameter) obtained was as follows:

D10 (μm)=3.90

D50 (μm)=19.60

D90 (μm)=78.40

Examination of this suspension under a light microscope showed that the majority of the particles had diameters in the range of 3 to 6 μm.

EXAMPLE 5

Preparation of Solids

Doubly distilled water or deionised water and as-received Bellasol S50™ (ex BioLabs; a phosphino-copolymer of acrylic acid and AMPS) having a molecular weight of about 3,700 were introduced into a round bottomed flask and the resulting mixture stirred using a magnetic follower until the Bellasol S50™ was dissolved in the doubly distilled water or deionised water. Polyvinyl alcohol having a molecular weight of about 16,000 (ca. 10 g; 98-98.8% hydrolysed, molecular weight range 13,000-23,000, ex Aldrich) was ground into a fine powder and then slowly added to the mixture in the flask with rapid stirring. Stirring was continued for four hours at room temperature until the polyvinyl alcohol had dissolved.

The resulting solution was then heated to a temperature of 85° C. and maintained at this temperature for a period of 1 hour using a temperature controlled heating mantle (with the round bottomed flask clamped in an oil bath) and a reflux condenser to prevent fluid evaporation, with constant rapid stirring using a magnetic follower, to allow temperature equilibration. Fuming hydrochloric acid was then added (ca. 40 g; 12.1 M) to the stirred mixture to initiate the esterification reaction while continuing to maintain the temperature of the mixture at 85° C. The acid was added slowly over a period of 80 minutes in three portions. It was observed that the solution started to turn brown in colour on addition of the acid, with the intensity of the colour increasing as more acid was added. The mixture formed a gel after ca. 2 hours. Heating was continued for a further hour. The stirrer was then switched off. The compositions of the various solids comprising esterifiable scale inhibitor cross-linked with polyol are given below in Table 1.

TABLE 1

Solid Compositions

| Run No. | Fluid | Wt Fluid (g) | Reaction Time (hours) | Temp (° C.) | Wt of PVA[a] (g) | Wt of Bellasol S50[b] (g) | Wt of Acid (g) | Bellasol S50:PVA Ratio |
|---|---|---|---|---|---|---|---|---|
| 1 | DDW[c] | 60.314 | 24 | 85 | 10.195 | 120.594 | 40.315 | 11.83 |
| 2 | DDW[c] | 60.200 | 24 | 85 | 10.005 | 162.041 | 40.654 | 16.196 |
| 3 | DIW[c] | 60.029 | 24 | 85 | 10.002 | 10.025 | 40.415 | 1 |
| 4 | DIW[d] | 60.668 | 24 | 85 | 10.001 | 10.124 | 40.316 | 1.01 |
| 5 | DIW[d] | 60.029 | 6 | 85 | 10.041 | 20.504 | 40.015 | 2.04 |
| 6 | DIW[d] | 60.068 | 6 | 85 | 10.138 | 30.338 | 40.000 | 2.99 |
| 7 | DIW[d] | 60.330 | 6 | 85 | 10.291 | 10.169 | 40.163 | 0.988 |
| 8 | DIW[d] | 100.825 | 6 | 85 | 20.019 | 10.403 | 40.126 | 0.52 |
| 9 | DIW[d] | 60.330 | 6 | 85 | 10.763 | 60.466 | 40.136 | 5.62 |
| 10 | DIW[d] | 100.948 | 6 | 85 | 30.166 | 10.792 | 40.256 | 0.358 |

[a]PVA = polyvinylalcohol;
[b]Bellasol S50 ™ = a phosphino-copolymer of acrylic acid and AMPS;
[c]DDW = doubly distilled water;
[d]DIW = deionised water.

The solids were wet milled as a slurry in deodorized kerosene using a Retsch PM400 ball mill. The particle size of the suspension was determined using a MicroTrac SRA 9200 laser particle sizer. The milling steps required to reduce the particle size to a d50 of ca. 0.3 μm are presented in Table 2 below.

TABLE 2

Milling procedure

| Step No. | Type of bowl | Type of balls | Number of balls | Time (min) | Speed (rpm) | Repetition | Weight (g) | Size of particles | | |
|---|---|---|---|---|---|---|---|---|---|---|
| 1 | 250 ml | 20 mm | 15 | 10 | 400 | 1 | 3.9 | 1 cm | | |
| 2 | 250 ml | 20 mm | 9 | 10 | 400 | 1 | 3.6 | less than 1 cm | | |
| 3 | 250 ml | 20 mm | 7 | 10 | 400 | 1 | 3.5 | powder with some big pieces | | |
| 4 | 250 ml | 20 mm | 7 | 20 | 400 | 1 | 3.5 | d10 = 19.22 | d50 = 106.0 | d90 = 244.6 |
| 5 | 250 ml | 10 mm | 25 | 20 | 400 | 1 | | d10 = 4.543 | d50 = 31.75 | d90 = 83.26 |
| 6 | 250 ml | 10 mm | 25 | 20 | 400 | 2 | | d10 = 2.550 | d50 = 13.98 | d90 = 36.99 |
| 7 | 250 ml | 10 mm | 25 | 20 | 400 | 2 | | d10 = 2.094 | d50 = 9.446 | d90 = 25.27 |
| 8 | 250 ml | 10 mm | 50 | 20 | 400 | 2 | 3.5 | d10 = 1.709 | d50 = 6.121 | d90 = 16.55 |
| 9 | 250 ml | 10 mm | 50 | 20 | 400 | 2 | 3.5 | d10 = 1.578 | d50 = 5.244 | d90 = 14.17 |
| 10 | 250 ml | 10 mm | 50 | 20 | 400 | 2 | 3.5 | d10 = 1.606 | d50 = 5.355 | d90 = 16.84 |
| 11 | 80 ml | 10 mm | 15 | 20 | 400 | 2 | 4 | d10 = 1.592 | d50 = 4.829 | d90 = 14.52 |
| 12 | 80 ml | 10 mm | 15 | | | | | d10 = 1.4970 | d50 = 2.4777 | d90 = 4.924 |
| | | | | | | | | d10 = 0.4280 | d50 = 0.7179 | d90 = 2.735 |
| 13 | 80 ml | 10 mm | 15 | | | | | d10 = 0.2928 | d50 = 0.3895 | d90 = 0.5519 |
| | | | | | | | | d10 = 0.2819 | d50 = 0.7952 | d90 = 1.585 |
| | | | | | | | | d10 = 0.2158 | d50 = 0.3104 | d90 = 1.184 |
| | | | | | | | | d10 = 0.0046 | d50 = 0.1397 | d90 = 0.2226 |
| | | | | | | | | d10 = 0.4759 | d50 = 1.1790 | d90 = 3.015 |
| 14 | 80 ml | 10 mm | 15 | | | | | d10 = 0.2655 | d50 = 0.3598 | d90 = 0.4549 |
| | | | | | | | | d10 = 0.2336 | d50 = 0.3099 | d90 = 1.716 |
| | | | | | | | | d10 = 0.2429 | d50 = 0.3018 | d90 = 0.4211 |
| | | | | | | | | d10 = 0.2184 | d50 = 0.3767 | d90 = 1.639 |

EXAMPLE 6

Controlled Release of Scale Inhibitor (i) Determination of Total Scale Inhibitor Concentration in the Solid Compositions A known mass of each solid composition was digested in a Perkin-Elmer MULTIWAVE microwave oven using nitric acid. Resulting solutions were diluted to a known volume and the phosphorus content determined by Inductively Coupled Plasma Atomic Emission Spectroscopy using cobalt as an internal standard.

(ii) Leached Scale Inhibitor Concentration Determination

A known mass of each solid composition was weighed into a 4 oz acid-washed powder jar. To this was added 100 ml of a 0.35 wt % NaCl solution made up in deionised water. The jar was capped and the sample was then shaken before a 2 ml aliquot of liquid was taken using a calibrated Gilson pipette. The aliquot was filtered and the phosphorus content determined by Inductively Coupled Plasma Atomic Emission Spectroscopy, using cobalt as an internal standard. The solutions were then placed in an oven at 70° C. and the analysis repeated at timed intervals (24, 48, 72, 96, 192 and 276 hrs).

TABLE 3

Scale Inhibitor Release from 0.2 g of solid in 100 ml of 0.35 wt % NaCl Solution Bellasol S50 ™ Concentration (mg/l)

| | Run 1 | Run 2 | Run 3 | Run 4 | Run 5 | Run 6 | Run 7 | Run 8 | Run 9 | Run 10 |
|---|---|---|---|---|---|---|---|---|---|---|
| 0 hrs | 1144 | 1540 | 43 | 86 | 204 | 231 | 100 | 93 | 634 | 77 |
| 24 hrs | 1256 | 1566 | 50 | 96 | 238 | 299 | 119 | 98 | 641 | 92 |
| 48 hrs | 1336 | 1750 | 62 | 115 | 257 | 328 | 150 | 105 | 714 | 94 |
| 72 hrs | 1440 | 1775 | 74 | 119 | 262 | 349 | 157 | 112 | 733 | 111 |
| 96 hrs | 1496 | 1832 | 84 | 196 | 296 | 375 | 164 | 143 | 787 | 133 |
| 192 hrs | — | — | — | — | — | — | — | — | — | — |
| 276 hrs | — | — | — | — | — | — | — | — | — | — |

TABLE 4

Scale Inhibitor Release from 0.1 g of solid in 100 ml of 0.35 wt % NaCl Solution Bellasol S50 Concentration (mg/l)

| | Run 1 | Run 2 | Run 3 | Run 4 | Run 5 | Run 6 | Run 7 | Run 8 | Run 9 | Run 10 |
|---|---|---|---|---|---|---|---|---|---|---|
| 0 hrs | 642 | 833 | 23 | 62 | 91 | 127 | 70 | 59 | 298 | 38 |
| 24 hrs | 732 | 855 | 32 | 63 | 131 | 183 | 77 | 61 | 359 | 46 |
| 48 hrs | 741 | 893 | 33 | 69 | 141 | 182 | 83 | 69 | 372 | 50 |
| 72 hrs | 824 | 927 | 36 | 84 | 157 | 204 | 88 | 71 | 392 | 58 |
| 96 hrs | 848 | 1037 | 46 | 100 | 158 | 216 | 86 | 76 | 415 | 58 |
| 192 hrs | — | — | — | — | — | — | — | — | — | — |
| 276 hrs | — | — | — | — | — | — | — | — | — | — |

TABLE 5

Scale Inhibitor Release from 2 g of solid in 100 ml of 0.35 wt % NaCl Solution

Bellasol S50 Concentration (mg/l)

| | Run 1 | Run 2 | Run 3 | Run 4 | Run 5 | Run 6 | Run 7 | Run 8 | Run 9 | Run 10 |
|---|---|---|---|---|---|---|---|---|---|---|
| 0 hrs | 1110 | 1468 | 31 | 44 | 159 | 257 | 91 | 48 | 654 | 40 |
| 24 hrs | 1368 | 1758 | 83 | 123 | 288 | 442 | 152 | 80 | 857 | 76 |
| 48 hrs | 1474 | 1842 | 99 | 146 | 339 | 542 | 190 | 96 | 958 | 98 |
| 72 hrs | 1580 | 1970 | 107 | 154 | 363 | 571 | 199 | 100 | 1009 | 100 |
| 96 hrs | 1654 | 2030 | 114 | 169 | 365 | 614 | 220 | 104 | 1058 | 106 |
| 192 hrs | — | — | 147 | 213 | 506 | 754 | 269 | 132 | 1244 | 129 |
| 276 hrs | — | — | 213 | 294 | 687 | 1002 | 368 | 171 | 1430 | 167 |

The invention claimed is:

1. A process for preparing particles of an esterifiable scale inhibitor cross-linked with a polyol via ester cross-links comprising the steps of:
   a) heating, in a reactor vessel, a concentrate comprising water, an esterifiable scale inhibitor, a polyol, and a strong acid catalyst under low shear conditions thereby forming a macrogel of the esterifiable scale inhibitor cross-linked with the polyol;
   b) drying the macrogel to form a solid; and
   c) comminuting the solid to give particles of esterifiable scale inhibitor cross-linked with polyol having a mean particle diameter of less than 1 micron.

2. A process as claimed in claim 1 wherein the shear rate in the reactor vessel is less than 0.1 ms$^{-1}$.

3. A process as claimed in claim 1 wherein the dried solid contains less than 0.1% by weight of water.

4. A process as claimed in claim 1 wherein the comminuted particles have a mean diameter in the range 100-750 nm.

5. A process as claimed in claim 1 wherein the solid is comminuted in the presence of a polymer which coats the exposed surfaces of the comminuted particles.

6. A method of inhibiting scale formation in a subterranean formation comprising:
   (a) injecting a suspension comprising particles of a controlled release scale inhibitor suspended in an aqueous medium into a formation through an injection well wherein the particles have a mean diameter of less than 1 micron;
   (b) allowing the suspension to percolate through the subterranean formation towards a production well; and
   (c) controllably releasing the scale inhibitor from the particles in the near well bore region of the production well.

7. A method as claimed in claim 6 wherein the particles comprise an esterifiable scale inhibitor crosslinked with a polyol through ester cross-links which are hydrolysable to release said scale inhibitor.

8. A method as claimed in claim 7 wherein the particles start to release the scale inhibitor through hydrolysis of the ester cross-links at a temperature of 50 to 1500° C.

9. A method as claimed in claim 6 wherein the suspension propagates through the formation at a rate of 15 to 100 feet per day.

10. A method as claimed in claim 6 wherein the injection well is 0125 to 1 mile from the production well.

11. A method as claimed in claim 7 wherein the esterifiable scale inhibitor cross-linked with a polyol is continuously dosed into the injection water in an amount in the range 0.01 to 2 weight percent.

12. A method as claimed in claim 6 wherein the amount of scale inhibitor released into the production water is in the range 1 to 200 ppm.

13. A process as claimed in claim 2 wherein the shear rate in the reactor vessel is less than 0.005 ms$^{-1}$.

14. A process as claimed in claim 3 wherein the dried solid contains less than 0.05% by weight of water.

15. A process as claimed in claim 4 wherein the comminuted particles have a mean diameter in the range 200-500 nm.

16. A method as claimed in claim 11 wherein the esterifiable scale inhibitor cross-linked with a polyol is continuously dosed into the injection water in an amount in the range 0.01 to 0.1 weight percent.

* * * * *